United States Patent Office 2,914,952
Patented Dec. 1, 1959

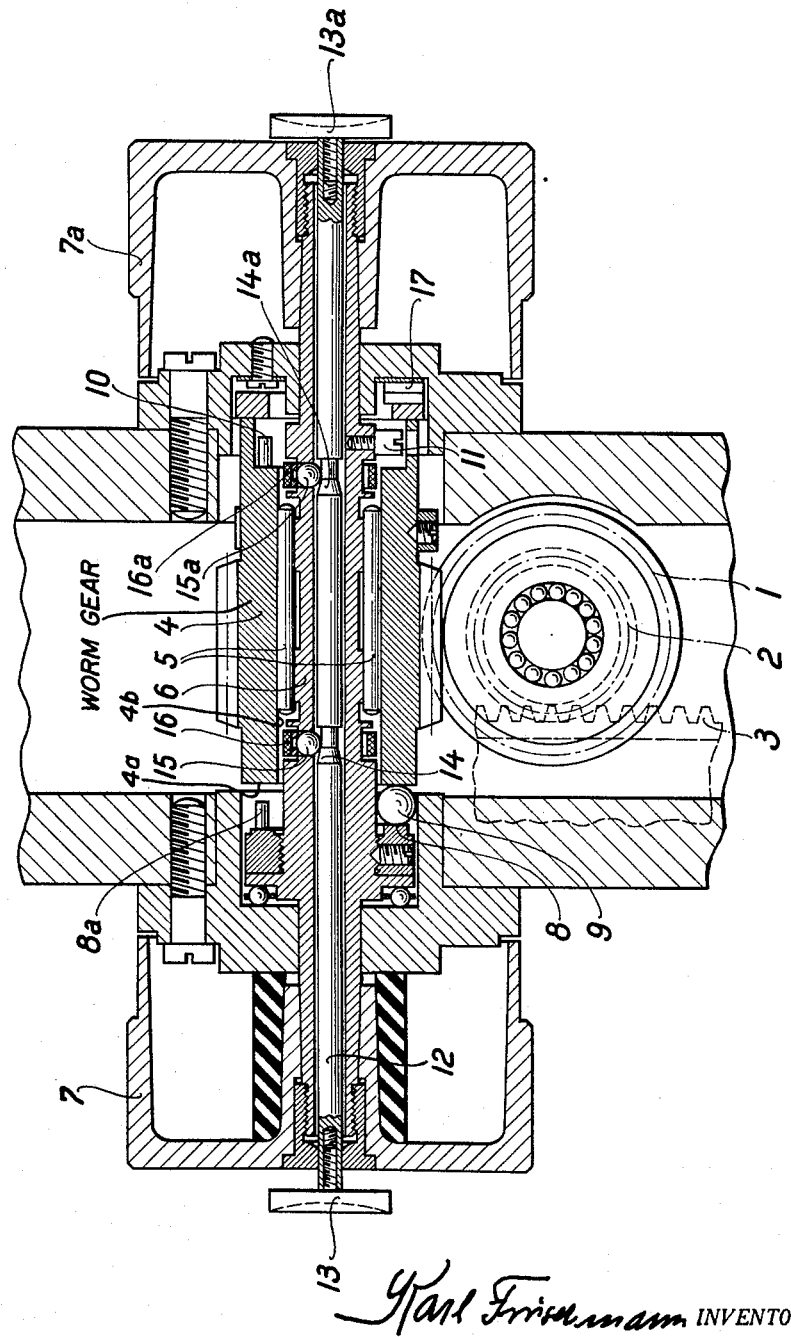

2,914,952

MECHANISM FOR COARSE AND FINE ADJUSTMENT

Karl Frischmann, Garbenheim, near Wetzlar, Germany, assignor to Ernst Leitz, G.m.b.H., a corporation of Germany Application March 19, 1958, Serial No. 722,526

Claims priority, application Germany March 28, 1957

10 Claims. (Cl. 74—10.5)

Precision instruments such as microscopes are customarily provided with a coarse and fine adjustment mechanism which requires separate operating knobs for each kind of adjustments. A single operating knob is disclosed in a prior adjustment mechanism in which the fine adjustment is operated between two stops, and not until one of these stops is reached does the coarse adjustment become effective. In this prior disclosure the adjustment mechanism is set somewhat beyond its final adjusted position by means of the coarse adjustment and the fine adjustment becomes effective by rotating the single operating knob backwards or in the opposite direction.

It has however been found that it is desirable to provide an adjusting mechanism so arranged that the coarse adjustment may be operated directly without or after operation of the fine adjustment, that is, without first waiting until the fine adjustment has reached a limiting stop or run its full course.

This invention has for its object to provide such a desirable adjustment mechanism and an embodiment of the invention is illustrated in the accompanying drawing in a sectional longitudinal view of the entire mechanism.

In the drawing the numeral 3 indicates a toothed rack which in a known manner is connected to the stage of a microscope, the details of which are not illustrated. The toothed rack 3 is adjusted vertically by a gear 2 which is carried by a worm wheel 1. The latter meshes with a worm gear 4.

The worm gear 4 is freely rotatable and axially movable supported upon a hollow shaft 6 by means of interposed roller bearings 5. When the worm gear 4 is moved axially it acts like a toothed rack upon the worm wheel 1. The hollow shaft 6 carries hand knobs 7, 7a and the shaft is also formed with a helical surface 8 and a projecting element or pin 8a. When the hollow shaft 6 is rotated the ball 9 on the helix 8 pushes the worm gear 4 axially for fine adjustment of the rack 3, the ball 9 running on the helix 8 in engagement with the annular end face 4a of the worm gear 4 as shown. The parts 4a, 8, 8a and 9 thus cooperate to act as a motion-transmitting connecting means which allow the worm gear 4 to be moved axially on the shaft 6 for fine adjustment upon rotation of the shaft.

The worm gear 4 also carries an abutment in the form of a pin 10 adapted to be engaged by another abutment in the form of an opposing screw 11 in the hollow shaft 6, and these parts cooperate to act as a connecting means for connecting the shaft 6 and the worm gear 4 to each other for rotation with each other when these parts occupy a certain angular position relative to each other. Within the latter there is an axially slidable rod 12 which is formed with cams 14, 14a adapted to engage coupling balls 15, 15a and push the balls outward to cause engagement between the radially movable bands 16, 16a and the inner wall 46 of the worm gear 4. This is accomplished by the rod 12, which is adapted to be operated manually through the hand buttons 13, 13a and thus serves as an axially movable manually operable actuating means, this function being effected through the intermediary of the camming surface 14, 14a and the balls 15, 15a. These parts, then, constitute a connecting means in the form of a clutch for connecting the shaft 6 and the worm gear 4 to each other.

In operation, and as shown in the drawing, when the hand button 13a is pushed inwardly in the hand knob 7a, the balls 15, 15a do not engage the bands 16, 16a and there is therefore no driving connection or coupling between the hollow shaft 6 and the worm gear 4. If the hollow shaft 6 is rotated by means of the hand knobs 7, 7a, the screw 11 will engage the pin 10 and then the worm gear 4 will be rotated in mesh with the worm wheel 1 for coarse adjustment of the rack 3.

This mechanism also provides means for operating the coarse adjustment without first operating the fine adjustment to one of its final positions. Fine adjustment is obtained by rotation of the hollow shaft 6 which then, via the helix 8 and elements 8a and 9 moves the worm gear 4 axially for fine adjustment. When, however, the pin 10 and the screw 11 engage each other, by rotation of the hollow shaft 6, the worm gear 4 will be rotated and the coarse adjustment becomes effective.

If fine adjustment is not wanted, the button 13 is pushed inward and then the worm gear 4 is at once connected to the hollow shaft 6 via the balls 15, 15a and the bands 16, 16a.

The two hand knobs or grips constitute in fact only one hand knob for rotation of the hollow shaft and the latter may be thus rotated from either side of the instrument. The signal actuating element for the shaft 6 is usually provided as shown because it is customary for the user of the instrument to use one hand on each side.

I claim:

1. An adjusting mechanism, comprising, in combination: a manually operated rotatable shaft; a worm gear supported on said shaft and being both rotatable and axially slidable relative thereto; first connecting means interposed between said shaft and said worm for moving the latter axially on the shaft for fine adjustment upon rotation of the latter; second connecting means interposed between said shaft and said worm gear for connecting the same for rotation with each other for coarse adjustment upon rotation of said shaft, said second connecting means being operative only when said shaft has been rotated to either of two end positions; and third connecting means interposed between said shaft and said worm gear for connecting the same for rotation with each other irrespective of the angular position of said shaft with respect to said worm gear, said third connecting means being manually operable whenever desired, whereby irrespective of the angular position of said shaft with respect to said worm gear, the latter may be adjusted coarsely without necessitating a fine adjustment thereof first.

2. An adjusting mechanism as defined in claim 1 wherein said first connecting means comprise a helical surface on said shaft and in axial alignment with an annular end face of said worm gear, a ball arranged between said helical surface and said end face, and a projecting element carried by said shaft for rotation therewith and projecting into the space between said helical surface and said end face, whereby upon rotation of said shaft, said projecting element engages said ball to cause axial displacement of said worm gear.

3. An adjusting mechanism as defined in claim 1 wherein said second connecting means comprise a first and second abutment carried by said shaft and worm gear, respectively, said abutments being adapted to engage each other when said shaft has been rotated into either of two angular end positions, whereby upon continued rotation of said shaft beyond either of said end positions, said first abutment is in engagement with said second abutment to cause rotation of said worm gear.

4. An adjusting mechanism as defined in claim 1 wherein said third connecting means comprise clutch means carried by said shaft and adapted to engage said worm gear, and manually operable actuating means for actuating said clutch means whenever desired.

5. An adjusting mechanism as defined in claim 4 wherein said clutch means comprise radially movable means adapted to engage the inner surface of said worm gear, and wherein said manually operable actuating means are axially movable and comprise camming means for moving said radially movable means outwardly into engagement with said inner surface of said worm gear.

6. An adjusting mechanism comprising, in combination: a worm gear mounted for both axial and rotational movement; worm gear actuating means for moving said worm gear axially for fine adjustment and for rotating said worm gear for coarse adjustment after said worm gear has been moved axially to one of two end positions; and connecting means interposed between said worm gear and worm gear actuating means for causing rotation of the latter upon actuation of the former, irrespective of the axial position of said worm, whereby said worm may be adjusted coarsely without necessitating a fine adjustment thereof first.

7. An adjusting mechanism comprising, in combination: a worm gear mounted for both axial and rotational movement; a rotatable shaft arranged coaxially with said worm gear; first connecting means interposed between said shaft and said worm gear for causing the latter to move axially in fine adjustment when said shaft is rotated; second connecting means interposed between said shaft and said worm gear for causing the latter to rotate upon rotation of said shaft, said second connecting means being so constructed and arranged as to be operative only after said shaft has been rotated to one of two end positions; and third connecting means interposed between said shaft and said worm gear for connecting the same to each other for rotation with each other irrespective of the angular position of said shaft with respect to said worm gear, whereby irrespective of the angular position of said shaft with respect to said worm gear, the latter may be adjusted coarsely without necessitating a fine adjustment thereof first.

8. In an adjusting mechanism incorporating fine and coarse adjustments, the former of which is movable between two positions upon the attainment of which further actuation of said fine adjustment causes actuation of said coarse adjustment, the improvement which comprises connecting means interposed between said fine and coarse adjustments for coupling the same together whenever desired, whereby said coarse adjustment may be actuated without first necessitating movement of said fine adjustment to and past either of its two positions.

9. In an adjusting mechanism incorporating a fine adjustment, actuating means for actuating said fine adjustment, and a coarse adjustment adapted to be actuated by said actuating means when the latter has moved said fine adjustment beyond either of two end positions, the improvement which comprises connecting means interposed between said actuating means and said coarse adjustment for coupling the same together whenever desired, whereby said coarse adjustment may be actuated without first necessitating movement of said fine adjustment to and past either of said two end positions thereof.

10. In an adjusting mechanism comprising an adjusting element, first moving means for moving said element with a fine adjustment, actuating means for actuating said first moving means, and second moving means for moving said element with a coarse adjustment, said second moving being adapted to be actuated by said actuating means when the latter has moved said first moving means beyond either of two end positions, the improvement which comprises connecting means interposed between said actuating means and said second moving means for coupling the same together whenever desired, whereby said element may be adjusted coarsely without necessitating a fine adjustment first.

References Cited in the file of this patent

UNITED STATES PATENTS

| | | |
|---|---|---|
| 2,166,532 | Naden | July 18, 1939 |
| 2,348,391 | Kester | May 9, 1944 |
| 2,869,373 | Erbe et al. | Jan. 20, 1959 |
| 2,877,651 | Erbe et al. | Mar. 17, 1959 |

FOREIGN PATENTS

| | | |
|---|---|---|
| 669,073 | France | Nov. 12, 1929 |